UNITED STATES PATENT OFFICE.

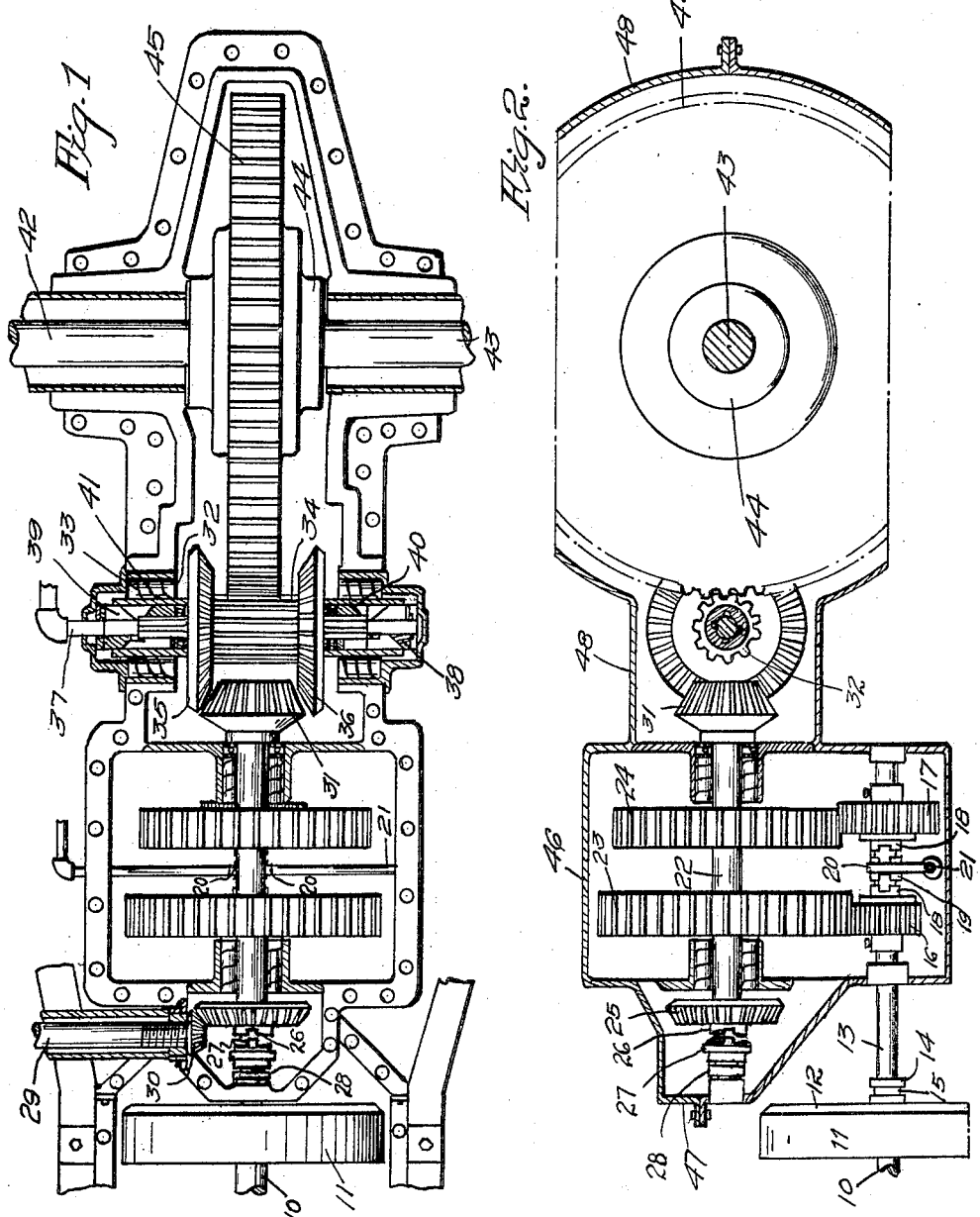

CLAUD E. MILLS, OF DES MOINES, IOWA.

TRANSMISSION-GEARING.

1,397,442.  Specification of Letters Patent.  Patented Nov. 15, 1921.

Application filed October 28, 1919.  Serial No. 334,058.

*To all whom it may concern:*

Be it known that I, CLAUD E. MILLS, a citizen of the United States, and resident of Des Moines, in the county of Polk and State of Iowa, have invented a certain new and useful Transmission-Gearing, of which the following is a specification.

The object of my invention is to provide a transmission gearing of simple, durable and inexpensive construction.

A further object of my invention is to provide a transmission gearing especially adapted for tractors, wherein there is no need of a universal or drive shaft construction.

A further object of my invention is to provide a transmission especially adapted for use with the tractor on account of its compact arrangement, whereby the comparatively short space available between the rear axle of the tractor and the rear end of the engine may be utilized to the best advantage.

A further object of my invention is to provide a transmission gearing wherein two or more relative speeds may be imparted from the engine to the rear axle to rotate the latter in either direction and the speed of rotation and direction of rotation may be controlled by independent levers.

A further object of my invention is to provide a simple compact arrangement, whereby change speed gearing portion of the device may be used to transmit power at two or more speeds to an auxiliary driving shaft.

With these and other objects in view, my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a top or plan view of my transmission the upper portion of the casing being removed, and parts being shown in section to better illustrate the construction, and Fig. 2 shows a side elevation of a transmission with parts illustrated in section and the casing removed.

Referring to the accompanying drawings, I have used the reference numeral 10 to indicate generally the rear end of an engine shaft whereby the power is transmitted to my transmission gearing.

Fixed to the end of the shaft 10 is one of a pair of clutch members 11. A coacting clutch member 12 is mounted on a stub shaft 13 and provided with a collar 14, having an annular groove 15 therein; adapted to receive a fork or other suitable device, whereby the clutch member 12 may be moved into and out of engagement with the clutch member 11 to selectively lock or unlock the shaft 10 from movement relative to the shaft 13.

Rotatably but non-slidably mounted upon the shaft 13 rearwardly from the collar 14 are a pair of spaced gears 16 and 17 of different diameter. Each gear has secured to its side adjacent to the other gear, a clutch member 18 designed to coact with a double ended clutch member 19, which is slidably but non-rotatably mounted on the shaft 13 and longitudinally movable by means of a fork 20 secured to a transverse shaft 21.

Above the shaft 13 and parallel therewith is a drive shaft 22, to which are secured gears 23 and 24 adapted to mesh continuously with the gears 16 and 17 respectively.

From the construction of the parts just described it will be seen that rotation may or may not be imparted to the shaft 13 from the shaft 10 by the use of the clutch members 11 and 12.

Rotation may be imparted to the shaft 22 from the shaft 13 at either of two speeds by selectively locking the gear 16 or the gear 17 from movement relative to the shaft 13 by shifting the clutch member 19. At the forward end of the shaft 22 is a beveled pinion 25, rotatably but non-slidably mounted, the latter having a clutch member 26 secured to the forward side thereof.

A coacting clutch member 27 is slidably but non-rotatably mounted upon the shaft 22 and provided with a collar 28 having an annular groove therein designed to receive a fork whereby the clutch members 26 and 27 may be locked together to lock the gear 25 from movement relative to the shaft 22.

A shaft 29 is disposed in the same horizontal plane as the shaft 22, and at right angles thereto, the shaft 29 having a beveled pinion 30 fixed to the end thereof, adapted to mesh continuously with the beveled pinion 25.

It will therefore be seen that by manipulation of the levers controlling the clutch members 12, 19, and 27, that rotation may be imparted to the shaft 29 at either of two speeds relative to the speed of the engine shaft 10. By the use of the clutch member 27, it is also possible to operate the shaft 22 without rotating the shaft 29.

Rearwardly of the gears 23 and 24 on the shaft 22, a second beveled gear 31 is fixed to the end of the shaft 22. A transverse hollow shaft or sleeve 32 is mounted in bearings 33 rearwardly from the shaft 22 and with its longitudinal axis alined horizontally with the longitudinal axis of the shaft 22.

The central portion of the sleeve 32 is provided with longitudinal teeth 34 and beveled gears 35 and 36 are secured to the sleeve adjacent to the ends of the teeth 34, in such position that longitudinal movement of the sleeve 32 may selectively move both of the gears 35 and 36 out of engagement with the gear 31 or either gear 35 or 36 into engagement with the gear 31.

For moving the sleeve 32 longitudinally, a shaft or controlling rod 37 is journaled concentrically within the sleeve 32 and has toothed collars 38 and 39 secured thereto, adjacent to either end.

Slidably but non-rotatably mounted within the sleeve 32 are a pair of coacting toothed collars 40 and 41 adapted to coact with the toothed collars 38 and 39, whereby rotation of the shaft 37 will cause corresponding longitudinal movement of the collars 40 and 41. Longitudinal movements of the collars 40 and 41 causes similar longitudinal movement of the sleeve 32 thereby selectively moving it to position where neither of the gears 35 or 36 will engage the gear 31 or to position where either of the gears 35 or 36 will engage the gear 31.

Rearwardly from the sleeve 32 and preferably alined horizontally therewith are the rear axle members 42 and 43, which extend into the differential casing 44. The differential casing 44 has the ring gear 45 mounted thereon, which is adapted to mesh continuously with the teeth 34 on the sleeve 32 in any of the positions of the sleeve.

Surrounding the gears described, I preferably provide a casing comprising the substantially rectangular cross section portion 46 adapted to house the change speed gearing and a portion 46 adapted to house the auxiliary drive shaft mechanism and a portion 48 adapted to house the reverse and differential structure.

Some changes may be made in the construction and arrangement of the parts of my improved device, without departing from the essential features and purpose of my invention, and it is my intention to cover by my claim any modified forms of structure or use of mechanical equivalents, which may be reasonably included within its scope.

I claim as my invention:

In a device of the class described, an engine shaft, a driven shaft, a clutch connection between said shafts, gears rotatably but non-slidably mounted on said driven shaft having clutch members thereon, a sliding clutch member non-rotatably mounted on the driven shaft and adapted to be moved to selectively engage with the clutch members on the respective gears on said shaft, a counter-shaft parallel with said driven shaft, non-slidable gears fixed on said counter-shaft in mesh with the respective gears on said driven shaft, a transverse shaft, spaced beveled gears thereon slidably but non-rotatably mounted, a gear of smaller diameter connecting said spaced beveled gears, a beveled gear on said counter-shaft adapted to mesh with said respective beveled gears in different positions thereof, means for sliding said beveled gears, a differential gear in mesh with the gear which connects said beveled gears, a beveled gear rotatably mounted on said counter-shaft having a clutch member, a clutch member slidably but non-rotatably mounted on said counter-shaft adapted to coact with the clutch member on said last gear, a second driven shaft having a gear thereon in mesh with said last beveled gear.

Des Moines, Iowa, July 28, 1919.

CLAUD E. MILLS.